Inventor:
JUSTUS LUTHER

Feb. 13, 1962 J. LUTHER 3,020,689
METHOD AND APPARATUS FOR THE CONTINUOUS FILLING OF
PLASTIC TUBING WITH STERILE LIQUIDS
Filed April 8, 1959 3 Sheets-Sheet 2

Inventor:
JUSTUS LUTHER

Inventor:
JUSTUS LUTHER

United States Patent Office 3,020,689
Patented Feb. 13, 1962

3,020,689
METHOD AND APPARATUS FOR THE CONTINUOUS FILLING OF PLASTIC TUBING WITH STERILE LIQUIDS
Justus Luther, Munich, Germany, assignor, by mesne assignments, to Allgäuer Alpenmilch A.G., Munich, Germany, a corporation of Germany
Filed Apr. 3, 1959, Ser. No. 805,030
7 Claims. (Cl. 53—140)

The invention relates to an apparatus for continuous filling of plastic tubing with sterile liquid food products, particularly milk.

Extruded tubing may be filled with sterile liquid foodstuffs, and the filled tubing may then be divided into individual containers. However, in such filling operation the problem exists that the extruded sterile tubing is reinfected by the atmosphere as long as the tubing is not sealed.

It is a principal object of the invention to provide an apparatus by means of which it is possible to sterilize the space enclosed by the sterilely produced tubing and the filling conduit before the filling operation is started. In this way the extruding and filling operation may be continued in the open atmosphere without requiring further sterilization.

Other objects and advantages will become apparent from a consideration of the specification and claims.

Figure 1:
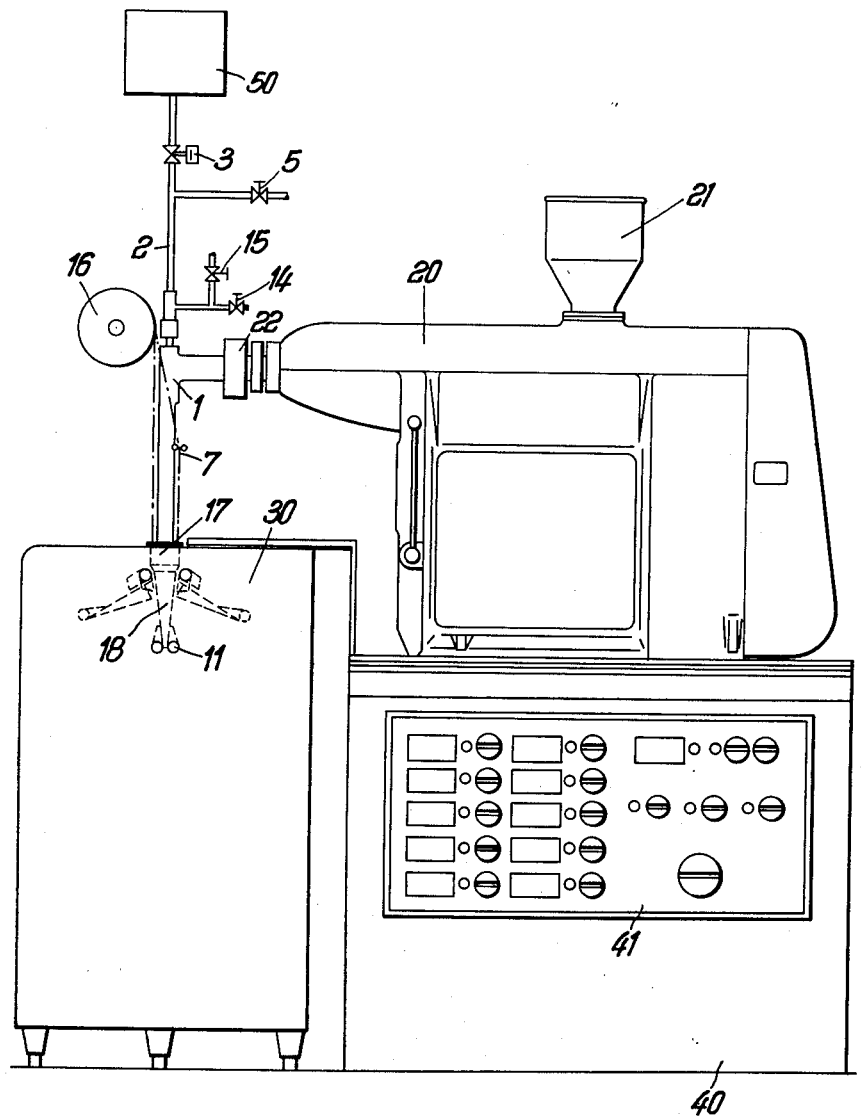
Figures 2A, 2B, 2C, 3:
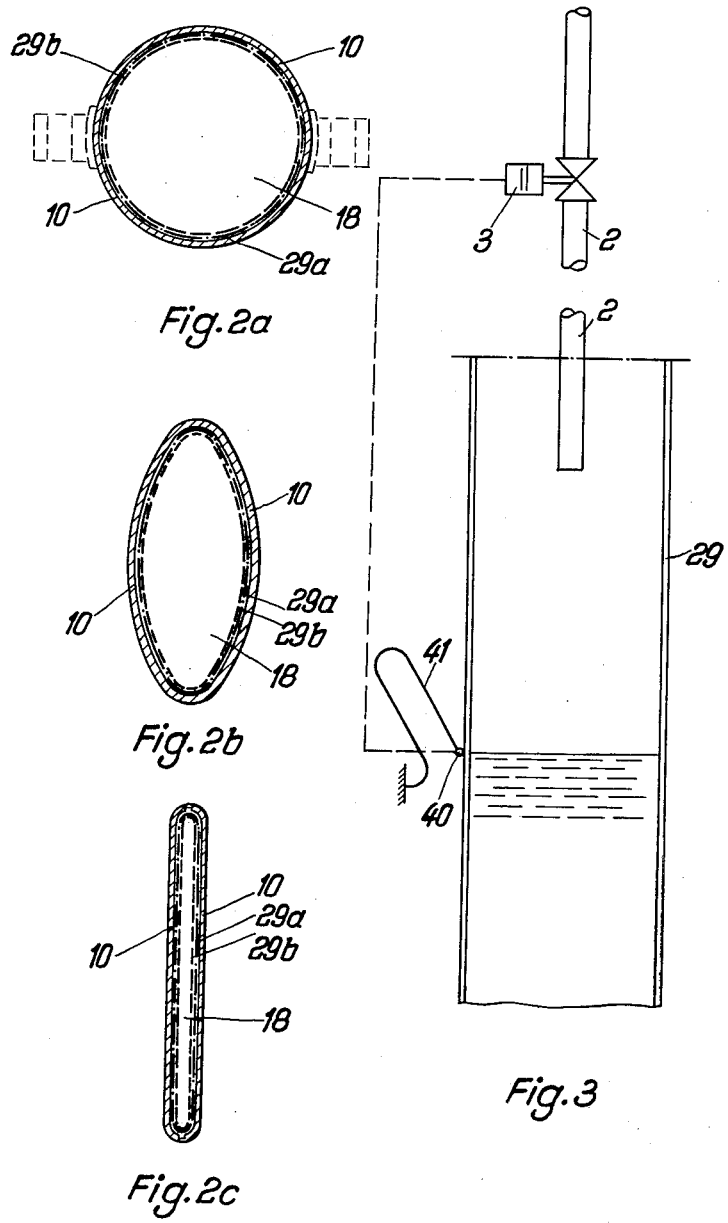
Figure 2:
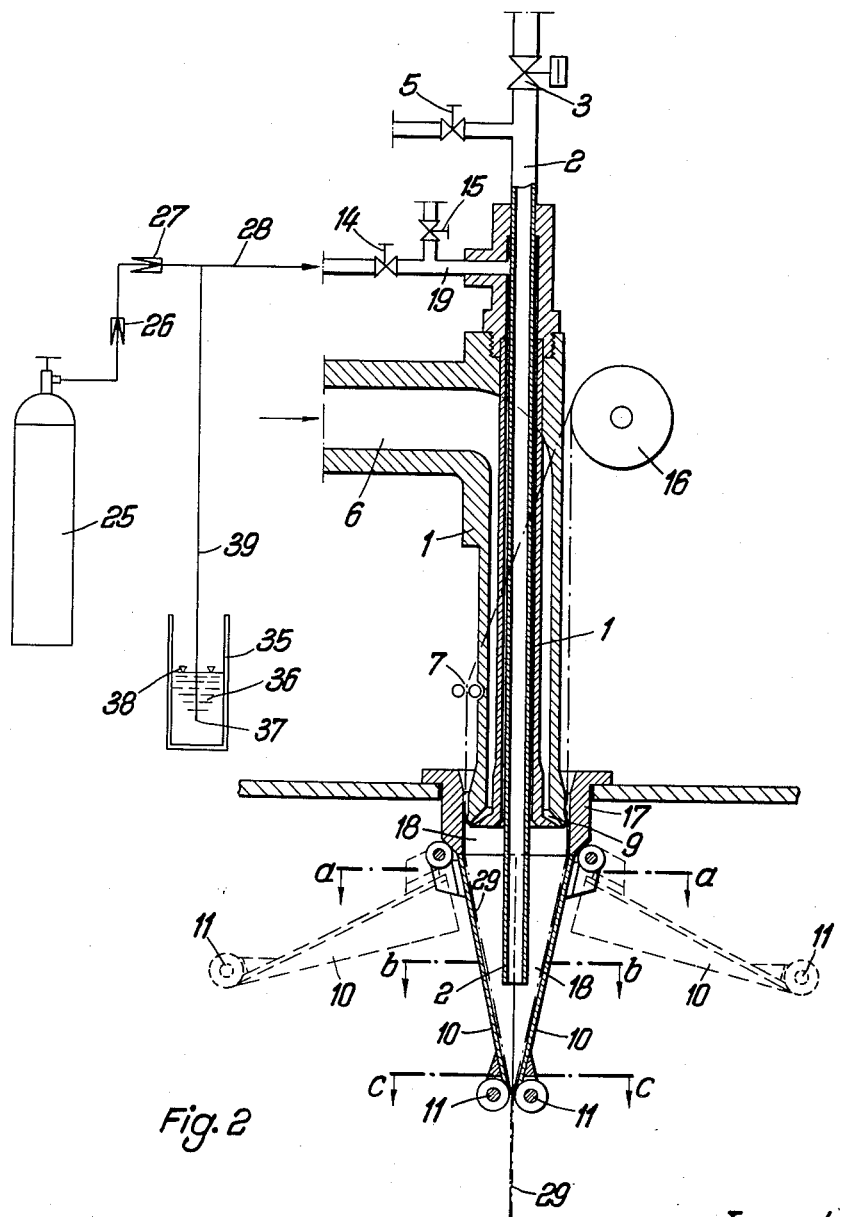

The invention will be better understood with reference to the accompanying drawings, in which FIG. 1 is a schematic illustration of an entire plant comprising an extrusion apparatus with an extruder head suitable for the method of the invention, in combination with a filling machine;

FIG. 2 is a cross-sectional view of the extruder head of FIG. 1, showing partially in elevation and partially in plan view, additional devices for carrying out the invention;

FIGS. 2a, 2b, and 2c are elevational views, on an enlarged scale, taken on lines a—a, b—b, and c—c of FIG. 2, respectively;

FIG. 3 is a diagrammatic section through a portion of the sterilized, sealed and filled tubing, taken between the lower end of the extruder head and the packaging machine arranged below the extruder head.

Referring now first to FIG. 1, the numeral 20 designates an extruder of conventional design which prepares and liquifies the plastic material fed through hopper 21 and forces the liquefied material under pressure through 22 into the head 1. The extruded and filled tubing 29 passes into the packaging machine 30; a suitable machine is the machine sold under the name "Tetramachine" by the Swedish company Tetra-Pak A.B. of Lund, Sweden. Said machine produces from the continuously extruded and filled tubing continuously individual filled containers in the form of bags, tetrahedral packages, and the like.

As the packaging machine itself is known, a detailed description of the forming, sealing, and separating operations of the individual containers in the machine will be omitted as not forming part of the invention.

A foundation 40 supports the extruder 20 and a switch board 41 with the required switches, dials and other instruments.

The construction of the extruder head 1 and its operation, which is the object of this invention, will be seen from FIG. 2.

The head 1 contains a heated channel 6 ending in an annular nozzle 9 for extruding the plastic tubing or a plastic lining on the inside of a paper tubing. The paper web for such outer paper tubing is supplied from roll 16 and passes through a welding device 7 for joining the edges and forming the tube.

A pipe 2 passes centrally through the channel 6 and the nozzle 9 and is equipped with an automatically operated valve 3 for the admission of sterile milk from a storage tank 50 (FIG. 1) and with a valve 5 for the admission of high-pressure or super-heated steam for sterilization. The central pipe 2 is enclosed in a jacket 13, which is supplied with sterilizing steam and/or with a sterile gas, for instance, from a bottle 25 and conduit 28, through pipe 19. The admission of the sterilizing gas and steam is controlled by valves 14 and 15, respectively. The gas pressure is further controlled by a reducing valve 26 and a precision pressure reducer 27. The conduit 28 is connected by means of a line 39 with a safety control in form of a vessel 35 with constant liquid level 36. The line 39 terminates at a predetermined depth below the water level 38. When the pressure in the lines 28, 29 exceeds a predetermined maximum, which corresponds to the height of the water column between the end 37 of line 39 and the level 38, the excess gas escapes through the liquid 36. Line 39 is so long as to prevent liquid to be sucked into the pipes 28, 19 if a pressure drop should occur in said pipes.

The nozzle 9 is surrounded by a guide ring 17 on which there are flaps 10 displaceably or pivotally arranged, provided with end rolls 11; the design and purpose thereof will be understood from the following description.

The apparatus operates as follows:

A web of paper which is to form the tube, is unwound from the continuous roll 16, and is laid around the lower part of the extruder head 1, in the form of a cylinder. The two outer edges of the web are joined in the welding apparatus 7 (e.g. through the use of plastic as sealing material) producing a paper tube. This paper tube may be pushed just over the lowermost end of the extruder head 1, assisted by the guiding ring 17. A thermoplastic material, such as polyethylene, is forced from the extruder 20, through the heated duct 6 and the annular nozzle 9, against the inner wall of the continuously advancing paper tube, and is bonded to the paper tube like a lining preferably assisted by the excess gas pressure inside the tube. The thus formed tubing 29 which now consists of paper coated with plastic on the inside, is further pulled down and threaded into the already running machine 30 which pulls it down, forms the package and seals it. This machine comprises conventional sealing and cutting means which close and divide the tubing in suitable intervals to form individual containers. Such machines are known and will therefore not be illustrated or described.

Now the orderly functioning of those parts of the apparatus which have been operating so far, and the condition of the tubing may be tested. For this purpose, some sample containers are filled with sterilized cold water to test the operating of the apparatus before sterilized milk is introduced.

Before the tubing 29 can be filled from the container 50 through valve 3 with the sterilized contents (e.g. germ-free milk), the pipe 2 through which the milk enters the tubing, the hollow jacket 13, and the air which is present at the discharge end 18 on the inside of the continuously moving tubing 29 must be sterilized. This is done by the introduction of high-pressure superheated steam into the milk conduit 2 through the valve 5. In order that said steam may sterilize the air left in the space 18 enclosed by the newly formed tubing reliably and in a short time, back pressure must be produced by reducing the cross-sectional area of the tubing which in turn produces the required heat shock.

For this purpose, the two parts 10 are swung from the position shown in dashed lines into the position shown in unbroken lines around the continuously forming tubing 29, which advances towards the packaging machine, at a point below the nozzle 9. These two parts 10 support the walls of the tubing 29 against the pressure of the sterilizing steam. Preferably their cross section at the upper end is a semi-circular groove-like channel (FIG. 2a) which, corresponding to the gradual constriction of the cross-sectional area of the tube, becomes progressively more shallow (FIG. 2b), ending at the rollers 11 in form of a flat band (FIG. 2c). The dot and dash line 29a in FIGURES 2a–2c represents the outer wall of the paper tubing and the broken line 29b represents the inside plastic lining of the tubing. The purpose of the rollers 11 is to let the compressed tubing pass without friction, since the lined tubing continues being formed during the process of sterilization. The parts 10 and the rollers are constructed strong enough to permit a steam shock of, for instance, about 5–10 superatmospheric pressure on the inside of the tubing. It is also possible to operate with superheated steam at a smaller pressure of 2 atmospheres (1 atm. above normal). The excess steam, which cannot pass through the rollers 11 of the constricted tubing, may escape through the hollow jacket 13 which is concentric with the milk line 2, and valve 15.

The steam shock sterilization is continued at least until the tubing just leaving the nozzle 9 at the beginning of the sterilization passes the rollers 11, or until the tube portion entering at said time the rollers 11 has reached the welding jaws of the machine 30 and has been sealed. At the end of the heat shock sterilization (e.g. about 10 seconds), the steam exhaust valve 15, and the steam admission valve 5 are closed. Since the steam inside the extruding head and inside the space 18 immediately condenses, resulting in the collapse of the freshly formed tubing in the space 18 or between the flaps 10, it is necessary that as valve 5 is closed, valve 14 must be opened, either automatically or manually. Said valve 14 allows the space 18 below nozzle 9 and between flaps 10, together with all other passages of the extruder head 1 to be filled with sterile gas under pressure. The closure of valves 5 and 15 may be automatically coupled with the opening of valve 14. Valve 14 may then be closed or left open to keep the space 18 at a constant predetermined pressure of the sterile gas. The pressure in the space 18 helps in applying the inner coating to the paper tubing and to produce a strong bond therebetween. At the same time, the continued small excess pressure in the newly formed tube, particularly above the level of the later admitted milk, insures that no bacteria may enter through any possible local leaks into the tubing.

It is obvious that the sterilization process must be carried on in such a manner that it includes conduits 28 and 39, and the pressure valves 26 and 27.

Subsequently, the germ-free milk which is to be packaged is admitted through valve 3 into the sterilized space 18. The milk will fill the space 18 to a certain level, for instance until the cushion of sterilized gas above the milk has been compressed to a pre-determined pressure dependent on the pressure of the entering milk. In this case, it is possible to adjust the milk level by controlling the pressure of the germ-free gas coming from the compressed gas bottles 25, and also by the pressure of the inflowing milk. The level of the milk in the space 18 may also be controlled by other suitable means, for instance by means of an automatically actuated valve. Such a device is shown diagrammatically in FIGURE 3 and comprises, for example, a thermo-element 40 which is forced by a curved spring 41 or the like against the outside wall of the filled tubing at a point to which the continuously formed tubing should be kept filled during the packaging operation. This arrangement makes use of the fact that the wall of the tubing has a comparatively high temperature due to the applied plastic lining. As the tubing is filled with cold, germ-free milk, its temperature is suddenly considerably lowered. The thermo-element is connected with an electro-pneumatically operated control valve 3 in such manner that the valve opens more or less at increasing temperatures and closes more or less, or completely, at decreasing temperatures of the contact point of thermo-element 40 and tubing wall 19. In this manner, the milk level is kept automatically at the level determined by the locating of the thermo-element. In this way, the milk is kept from coming in contact with the hot parts of the extruder head in the vicinity of the annular nozzle 9, and a uniform milk content in the subsequently formed and separated individual containers assured.

Then, the flaps 10 with the rollers 11 are separated (dotted position in FIGURE 2), and the final operating condition is achieved. The process of forming and filling the tube and its packaging may be carried on at any desired speed of the machine without any repetition or continuation of the sterilizing process.

It is a particular advantage of the invention that the sterile gas cushion hardly needs to be replenished once it has been produced, so that the consumption of gas from the bottle 25 is negligible.

After the flaps 10 together with the rollers 11 have been opened, the sealing mechanism located below the extruder comes into use and divides the continuously advancing tubing into individual containers by welding it perpendicular to its axis, and if desired, also parallel thereto. The continual packaging of the liquid contents is thus begun. The individual containers may be shaped into any desired form, such as bag-shaped, rectangular, tetrahedral, and the like. The packaging process may be carried on continually without repetition of the above described sterilization by steam, as long as the sterilized contents flow from container 50, and the tube forming process at nozzle 9 continues smoothly. Fresh bacterial infection at the filling head and in the space 18 can not occur since the inside wall of the tube is made of hot sterilized plastic material which keeps the space sterilized.

It should be pointed out that throughout the complete process of sterilization, the paper tubing, which from the annular nozzle 9 on is coated on the inside with the plastic material, is steadily and continuously pulled downward through a machine which is not shown.

The principle of the described operation is not changed, if instead of paper tubing coated on the inside with a plastic material, tubing is used which consists entirely of plastic material extruded through nozzle 9. In this case, supplementary means may be necessary, and the extruded tubing must, of course, be allowed to harden sufficiently. It is also possible to combine both methods for producing tubings in such a way that in the beginning of the process the described plastic lined paper tubing is used; when the tube-producing operation has started, the paper tubing is omitted, so that then only pure plastic material tubing is produced.

Various changes and modifications may be made in details given herein without departing from the scope and spirit of the invention. It is possible, for instance, to allow the steam used for sterilization to move in the opposite direction, whereby the steam is admitted through valve 15 and leaves through valve 5.

The important feature of the invention resides in the single shock sterilization of the inside of the whole apparatus and the first formed tubing at the beginning of the filling and packaging operation. Further specific measures for maintaining the apparatus sterile after the first sterile sealing of the tubing are not necessary, since the packaging material, through its production, continues to remain germ-free. The invention makes it possible, for instance, to package cold sterile liquids whose sterility need not be protected by their own temperature. Also the finished container need no longer be heat-proof for sterilization.

I claim:

1. In a machine for the continuous manufacture of containers filled with a sterile liquid the combination comprising an extruder head for continuously forming tubing of flexible material, releasable pressure means located in spaced relationship from said extruder head along said tubing for sealing the newly formed tubing in a direction normal to its longitudinal axis at spaced locations therealong so as to obtain individual closed containers, releasable supporting means located between said releasable pressure means and the extruder head so as to support substantially the whole wall of the newly formed tubing along a predetermined portion of the path of said tubing immediately after said tubing leaves said extruder, said releasable supporting means constricting the cross section of the tubing at their point of engagement opposite from said extruder head so that the interior of the engaged tubing may be pressurized on engagement of the supporting means and is hereby supported against internal pressure, and means to inject steam under pressure into said extruder head and into said tubing while in operative engagement with said supporting means, and means to fill sterile liquid into said tubing after said supporting means have been released.

2. A machine as defined in claim 1 wherein said pressure means comprise a pair of cooperating flaps pivotally mounted on said extruder head, and a roller each at the free end of said flaps, said flaps and rollers engaging the tubing in operative position of the flaps.

3. A machine as defined in claim 1 comprising steam inlet and outlet ducts at the extruder head.

4. The machine as defined in claim 1 comprising a conduit for introducing sterile pressure gas into the extruder head, and means for regulating the level of a sterile liquid introduced into the interior of said tubing, said means including an inlet valve in said conduit.

5. The machine as defined in claim 4 comprising means opening said inlet valve when the steam injection into said extruder head is stopped.

6. The machine as defined in claim 4 comprising a liquid container, a line branching from said pressure gas conduit and opening into said liquid, the level of said liquid in said container and the level of the opening of said line in said liquid being adjusted to define the maximum pressure of said sterile gas in said conduit.

7. The machine as defined in claim 1 comprising a thermocouple contacting the wall of the tubing at the desired level of said sterile liquid and valve means adjusting the feed of said liquid, said valve means being controlled by said thermocouple.

References Cited in the file of this patent

UNITED STATES PATENTS

| | | |
|---|---|---|
| 1,463,636 | Stricker | July 31, 1923 |
| 2,651,897 | Howard | Sept. 15, 1953 |
| 2,736,656 | Marshall | Feb. 28, 1956 |
| 2,757,093 | Starzyk | July 31, 1956 |
| 2,816,837 | Holsman | Dec. 17, 1957 |
| 2,918,770 | Stocker | Dec. 29, 1959 |
| 2,928,219 | Gubler | Mar. 15, 1960 |